United States Patent
Varda et al.

(10) Patent No.: US 9,863,522 B2
(45) Date of Patent: Jan. 9, 2018

(54) TORQUE CONVERTER CLUTCH RELEASE FLUID LUBRICATION

(71) Applicant: GM Global Technology Operations LLC, Detroit, MI (US)

(72) Inventors: David J. Varda, West Bloomfield, MI (US); James D. Hendrickson, Oxford, MI (US); Steven P. Moorman, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 401 days.

(21) Appl. No.: 14/799,233

(22) Filed: Jul. 14, 2015

(65) Prior Publication Data

US 2017/0016527 A1 Jan. 19, 2017

(51) Int. Cl.
*F16H 57/04* (2010.01)

(52) U.S. Cl.
CPC ..... *F16H 57/0401* (2013.01); *F16H 57/0435* (2013.01)

(58) Field of Classification Search
CPC ............ F16H 57/0401; F16H 57/0435; F16H 57/0446; F16H 57/0441; F16H 57/0436; F16H 2061/0037; F16H 61/0021; F16H 61/0265; F16H 41/30; F16D 25/123; B60K 6/365; B60Y 2200/92
USPC ....................................... 184/6.12
See application file for complete search history.

(56) References Cited

U.S. PATENT DOCUMENTS

| | | | |
|---|---|---|---|
| 8,046,991 B2 * | 11/2011 | Long ............... | F16H 61/143 60/329 |
| 2009/0266068 A1 * | 10/2009 | Long ............... | F16H 61/0031 60/339 |
| 2012/0174570 A1 * | 7/2012 | Xie ................. | F16H 61/0031 60/441 |

* cited by examiner

*Primary Examiner* — William E Dondero
*Assistant Examiner* — Mark K Buse

(57) ABSTRACT

A torque converter clutch (TCC) release fluid lubrication system for a motor vehicle transmission includes a first fluid line, a second fluid line and a third fluid line. The first fluid line supplies TCC apply fluid to the TCC. The second fluid line receives TCC release fluid from the TCC. And the third fluid line supplies a first lubrication fluid to the transmission. The TCC release fluid and the first lubrication fluid combine into a second lubrication fluid that is fed into the transmission.

20 Claims, 2 Drawing Sheets

TORQUE CONVERTER CLUTCH RELEASE FLUID LUBRICATION

FIELD

Figure 1:
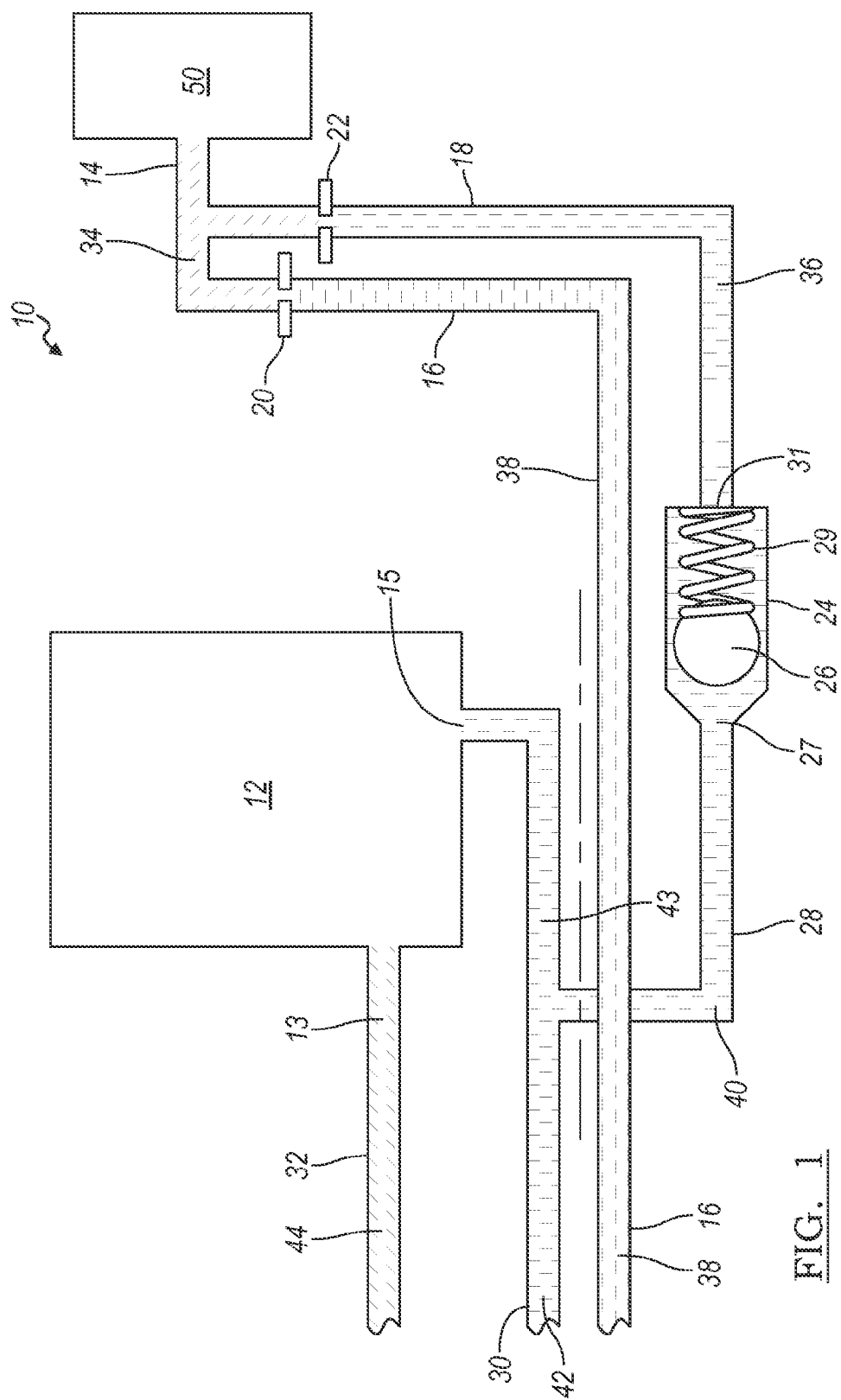

The present disclosure relates to a lubrication system for a motor vehicle transmission. More specifically, the present disclosure relates to release fluid from a torque converter clutch that provides further lubrication fluid to the transmission.

BACKGROUND

The statements in this section merely provide background information related to the present disclosure and may or may not constitute prior art.

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system generally includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a hydraulically actuated automatic transmission.

SUMMARY

A torque converter clutch (TCC) release fluid lubrication system for a motor vehicle transmission includes a first fluid line, a second fluid line and a third fluid line. The first fluid line supplies TCC apply fluid to the TCC. The second fluid line receives TCC release fluid from the TCC. And the third fluid line supplies a first lubrication fluid to the transmission. The TCC release fluid and the first lubrication fluid combine into a second lubrication fluid that is fed into the transmission.

Further features, advantages, and areas of applicability will become apparent from the description provided herein. It should be understood that the description and specific examples are intended for purposes of illustration only and are not intended to limit the scope of the present disclosure.

DRAWINGS

Figure 2:
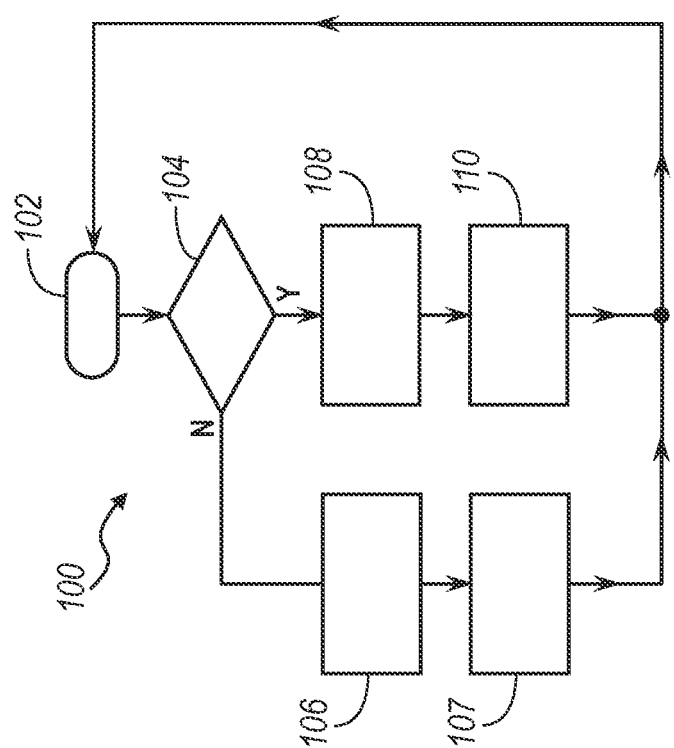

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 1 is a diagram of part of a lubrication system of a motor vehicle transmission; and FIG. 2 is a flow diagram of a process for operating the lubrication system shown in FIG. 1.

DETAILED DESCRIPTION

The following description is merely exemplary in nature and is not intended to limit the present disclosure, application, or uses.

Referring now to the drawings, a system for lubrication a motor vehicle transmission embodying the principles of the present invention is illustrated in FIG. 1 and designated at 10. The system 10 is operable to control torque transmitting mechanisms, such as synchronizers, clutches, and brakes within a transmission, as we as providing lubrication and cooling to components within the transmission and to control a torque converter coupled to the transmission. The system 10 includes a plurality of interconnected or hydraulically communicating subsystems that lubricates a torque converter clutch (TCC) 12 and other components of the transmission 50.

The system 10 includes fluid lines 14, 16, 18, 28, 30 and 32. The fluid line 32 supplies TCC apply fluid 44 to the TCC 12 through a port 13. And TCC release fluid 43 leaves the TCC 12 through a port 15. The TCC release fluid 43 may flow as TCC release fluid 40 into the fluid line 28 to an optional valve 24, or the TCC release fluid 43 may flow as TCC release fluid 42 into the TCC 12 through the fluid line 30, depending upon the operating conditions of the TCC 12. In certain conditions, as discussed in detail below, the TCC release fluid 40 flows through the valve 24 into the fluid line 18 as TCC release fluid 36. The TCC release fluid and the TCC apply fluid can be any suitable hydraulic fluid such as, for example, oil.

In a particular arrangement, the valve 24 is a check-ball valve that includes an inlet port 27 and an outlet port 31. The valve 24 also includes a ball 26 and a biasing mechanism 29, such as, for example, a coil spring. The biasing mechanism applies a force to the ball 26 towards the inlet port 27. Hence, if the force on the ball 26 produced by the hydraulic pressure of the TCC release fluid 40 in the fluid line 28 is less than the combined force on the ball 26 produced by the hydraulic pressure of the TCC release fluid 36 in the fluid line 18 and the force produced by the biasing mechanism 29, the ball 26 is pushed against the inlet 27 to prevent TCC release fluid 36 from flowing back into the fluid line 28.

When the hydraulic pressure of TCC release fluid 40 the fluid line 28 is sufficient to urge the ball 26 away from the inlet port 27, the TCC release fluid flows through the valve 24 such that the TCC release fluid 36 combines with lubrication fluid 38 from the fluid line 16 in the fluid line 14 as lubrication fluid 34. The fluid line 14 feeds the lubrication fluid 34 to the remainder of the transmission 50. The system 10 includes restriction orifices 20 and 22 that control the flow rate of the lubrication fluid 38 and the TCC release fluid 36 in the fluid lines 16 and 18, respectively. The lubrication fluid 38 can be any suitable hydraulic fluid such as, for example, oil.

When in use, the TCC 12 can be in an applied or engaged state or a release or unengaged state. Specifically, when the hydraulic pressure of the TCC apply fluid 44 in the fluid line 32 is or near zero, the TCC 12 is unengaged and the TCC release fluid 43 flows out of the fluid line 30 into the fluid lines 15 and 28. The TCC release fluid 43 flows past the valve 24 into the fluid line 18 as the TCC release fluid 36. The TCC release fluid 36 combines with the lubrication fluid 38 from the fluid line 16 as lubrication fluid 34 in the fluid line 14. The lubrication fluid 34 in the fluid line 14 is then fed into the lubrication circuit associated with other components 50 of the transmission.

To engage the TCC 12 to its applied state, pressure of the TCC apply fluid 44 in the fluid line 32 is increased. Any TCC release fluid 43 goes to the fluid line or exhaust outlet 30 as fluid 42. Hence, the pressure in the fluid line 28 is or near zero. As such, the valve 24 prevents leakage or backflow or TCC release fluid 36 into the fluid line 28.

Turning now to FIG. 2, there is shown a flow diagram of process 100 to operate the system 10. After an initiation step 102, the process 100 proceeds to a decision step 104. At the decision step 104, the process 100 decides whether to engage or un-engage the TCC 12. If the decision is to engage the TCC 12, the process 100 proceeds to a step 108 where the pressure of the TCC apply fluid 44 in the fluid line 32 increases such that the TCC 12 is engaged in the step 110. TCC release fluid 43 and 42 is exhausted from the TCC 12 through the fluid line or exhaust port 30.

If the decision at the step 104 is to un-engage the TCC 12, the process 100 proceeds to a step 106. At the step 106, pressure of the TCC apply fluid 44 in the fluid line 32 is reduced, and TCC release fluid 43 flows into the fluid line 28 as the TCC release fluid 40. The process 100 proceeds to a step 107 where the TCC 12 is unengaged and the TCC release fluid 40 flows through the valve 24 into the fluid line 18 as TCC release fluid 36. The TCC release fluid 36 combines with lubrication fluid 38 in the fluid line 14 as lubrication fluid 34. The combined fluid 34 flows through the fluid line 14 to feed the lubrication circuit for other components 50 of the transmission.

After the engage step 110 or the un-engage step 107, the process 100 returns to the initiation step 102.

The description of the invention is merely exemplary in nature and variations that do not depart from the gist of the invention are intended to be within the scope of the invention. Such variations are not to be regarded as a departure from the spirit and scope of the invention.

What is claimed is:

1. A torque converter clutch (TCC) release fluid lubrication system for a motor vehicle transmission, the system comprising:
   a first fluid line that supplies TCC apply fluid to the TCC;
   a second fluid line that sends TCC release fluid from the TCC; and
   a third fluid line that supplies a first lubrication fluid to the transmission,
   wherein the TCC release fluid and the first lubrication fluid combine into a second lubrication fluid that is fed into the transmission.

2. The system of claim 1 wherein the first fluid line supplies TCC apply fluid to the TCC to engage the TCC.

3. The system of claim 2 wherein the hydraulic pressure of the TCC apply fluid is greater than zero when the TCC is engaged.

4. The system of claim 2 wherein the TCC release fluid flows from the TCC to an exhaust port.

5. The system of claim 1 wherein the hydraulic pressure of the TCC apply fluid in the first fluid line is or near zero when the TCC is un-engaged.

6. The system of claim 5 wherein the TCC release fluid in the second fluid line combines with the first lubrication fluid in the third fluid line when the TCC is un-engaged.

7. The system of claim 1 wherein the third fluid line includes a restriction orifice to control the flow rate of the lubrication fluid in the third fluid line.

8. The system of claim 1 wherein the second fluid line includes a restriction orifice to control the flow rate of the TCC release fluid in the second fluid line.

9. The system of claim 1 wherein the second fluid line includes a valve that prevents backflow of the TCC release fluid in the second fluid line.

10. The system of claim 9 wherein the valve is a check-ball valve.

11. A method of lubricating a motor vehicle transmission comprising:
    releasing TCC release fluid from a torque converter clutch (TCC); a
    combining the TCC release fluid with a first lubrication fluid into a second lubrication fluid; and
    feeding the second lubrication fluid into the transmission.

12. The method of claim 11 further comprising supplying TCC apply fluid to the TCC to engage the TCC, wherein engaging the TCC stops feeding the second lubrication fluid into the transmission.

13. The method of claim 12 wherein the hydraulic pressure of the TCC apply fluid is greater than zero when the TCC is engaged.

14. The method of claim 12 wherein TCC release fluid flows from the TCC to an exhaust port.

15. The method of claim 11 further comprising reducing the hydraulic pressure of TCC apply fluid to the TCC into un-engage the TCC.

16. The method of claim 15 wherein the TCC release fluid combines with the first lubrication fluid when the TCC is un-engaged.

17. The method of claim 11 further comprising controlling the flow rate of the first lubrication fluid with a restriction orifice.

18. The method of claim 11 further comprising controlling the flow rate of the TCC release fluid with a restriction orifice.

19. The method of claim 11 further comprising preventing backflow of the TCC release fluid with a valve.

20. The method of claim 19 wherein the valve is a check-ball valve.

* * * * *